(12) United States Patent
Fava et al.

(10) Patent No.: US 6,467,564 B1
(45) Date of Patent: Oct. 22, 2002

(54) DEVICE FOR MANUALLY CONTROLLING THE ACCELERATION SYSTEM OF AN AGRICULTURAL MACHINE

(75) Inventors: Gianluca Fava; Giancarlo Sola, both of Modena (IT)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/707,045

(22) Filed: Nov. 6, 2000

(51) Int. Cl.⁷ .......................... B60K 17/00; G05G 11/00
(52) U.S. Cl. ............................. 180/336; 74/482; 74/513
(58) Field of Search .................. 180/315, 336; 74/470, 482, 513, 481

(56) References Cited

U.S. PATENT DOCUMENTS

| 3,002,397 | A | * | 10/1961 | Ahrens .......................... 73/527 |
| 3,237,478 | A | * | 3/1966 | Jewell .................. 123/198 DB |
| 3,869,937 | A | * | 3/1975 | Ahrens .......................... 74/482 |
| 3,898,891 | A | * | 8/1975 | Colloton .................. 180/336 |
| 4,052,910 | A | * | 10/1977 | Olt et al. .................. 192/223.3 |
| 4,059,025 | A | * | 11/1977 | Waack et al. .................. 74/470 |
| 4,283,965 | A | * | 8/1981 | Hansen .......................... 74/482 |
| 4,310,082 | A | * | 1/1982 | Elmy et al. .................. 192/218 |
| 4,335,624 | A | * | 6/1982 | Garman et al. ................ 74/470 |
| 4,466,504 | A | * | 8/1984 | Giandenoto et al. ........ 180/273 |
| 4,721,494 | A | * | 1/1988 | Hayashi et al. ........... 192/13 A |
| 4,723,933 | A | * | 2/1988 | Marto ....................... 192/99 S |
| 4,771,847 | A | * | 9/1988 | Michell ....................... 123/376 |
| 5,152,382 | A | * | 10/1992 | Hoch et al. .................. 180/336 |
| 5,323,570 | A | * | 6/1994 | Kuhlman et al. .............. 49/138 |
| 5,365,802 | A | * | 11/1994 | Suzuki et al. .................. 74/481 |
| 6,237,711 | B1 | * | 5/2001 | Hunt ........................... 180/315 |
| 6,243,988 | B1 | * | 6/2001 | Salice .......................... 49/125 |
| 6,282,839 | B1 | * | 9/2001 | Fischer et al. .............. 222/190 |

FOREIGN PATENT DOCUMENTS

| JP | 405330358 | * | 12/1993 | .................. 180/336 |
| JP | 406040265 | * | 2/1994 | .................. 180/336 |

* cited by examiner

*Primary Examiner*—Paul N. Dickson
*Assistant Examiner*—Toan C To
(74) *Attorney, Agent, or Firm*—Larry W. Miller; John William Stader

(57) ABSTRACT

A device manually controls the acceleration system of a tractor having both a foot pedal accelerator and a hand lever accelerator which can be positioned at different heights above the ground. The acceleration control mechanism includes a first lever hinged at a first end to a fixed pin; a first tie connecting a second end of the first lever to the acceleration system; and a second lever hinged at a first end to the fixed pin. The control mechanism also includes a pedal, which when activated rotates the first lever in a given direction to control the acceleration system by means of the first tie. A third lever is fitted to a fixed structure and can be activated manually to control the acceleration system by rotating the second lever in the aforementioned direction. A second tie connects the third lever to the second lever which rotates the first lever in the aforementioned direction to also control the acceleration system by manually activating the third lever. The acceleration control mechanism further includes a member that is operable to adjust the length of the second tie.

13 Claims, 3 Drawing Sheets

DEVICE FOR MANUALLY CONTROLLING THE ACCELERATION SYSTEM OF AN AGRICULTURAL MACHINE

BACKGROUND OF THE INVENTION

The present invention relates to a device for manually controlling the acceleration system of an agricultural machine.

As is known, the acceleration system of an agricultural machine, such as a tractor, can be controlled by means of a pedal (accelerator pedal), or by means of a hand-operated lever (accelerator lever) normally fitted to a fender of the machine. The accelerator pedal and lever are connected by a mechanism enabling pedal or lever control of the acceleration system indifferently, and so defining a timing device between the pedal and lever. The mechanism is formed as a second lever connected to the acceleration system by a first tie, which is also acted on by the accelerator pedal. The mechanism is also formed with a second tie maintained taut by spring and connecting the accelerator lever to a third lever, which, when rotated, rotates the second lever equally.

The fender supporting the accelerator lever is located a given height off the ground, which will differ from one agricultural machine to another, so that the length of the second tie would also vary from one machine to another. Therefore, since the height of the fender off the ground, and hence the position of the accelerator lever with respect to the third lever, differs from one machine to another, the length of the second tie must be adapted to keep the accelerator pedal and lever in time with each other. Similarly, if the user wishes to change the height of the fender or the location of the accelerator lever on the fender, the distance between the accelerator lever and the third lever must be measured accurately to keep the second tie taut, and a new second tie of the right length installed.

SUMMARY OF THE INVENTION

It is an object of the present invention to overcome the disadvantages of the prior art by providing a device for manually controlling the acceleration system of an agricultural machine.

It is a feature of the instant invention to provide an acceleration control system which may be installed, with no alterations to the component parts, on agricultural machines with different fender heights.

It is another object of the present invention to provide a device for manually controlling an acceleration system of an agricultural machine which includes a member for adjusting the length of the second tie.

It is an advantage of this invention to simplify the timing of the hand and pedal accelerators on a tractor.

It is another advantage of this invention that the control device can be installed, with no alterations to its component parts, on any agricultural machine.

It is still another advantage of this invention that both the manufacture and storage of the device itself, and installation of the device on the machine is greatly simplified.

These and other objects, features and advantages are accomplished according to the instant invention by providing a device for manually controlling the acceleration system of a tractor having both a foot pedal accelerator and a hand lever accelerator which can be positioned at different heights above the ground. The acceleration control mechanism includes a first lever hinged at a first end to a fixed pin; a first tie connecting a second end of the first lever to the acceleration system; and a second lever hinged at a first end to the fixed pin. The control mechanism also includes a pedal, which when activated rotates the first lever in a given direction to control the acceleration system by means of the first tie. A third lever is fitted to a fixed structure and can be activated manually to control the acceleration system by rotating the second lever in the aforementioned direction. A second tie connects the third lever to the second lever which rotates the first lever in the aforementioned direction to also control the acceleration system by manually activating the third lever. The device further includes a member that is operable to adjust the length of the second tie.

BRIEF DESCRIPTION OF THE DRAWINGS

The advantages of this invention will become apparent upon consideration of the following detailed disclosure of the invention, especially when taken in conjunction with the accompanying drawings, wherein.

DETAILED DESCRIPTION OF THE PREFERRED EMBODIMENTS

Figure 1:
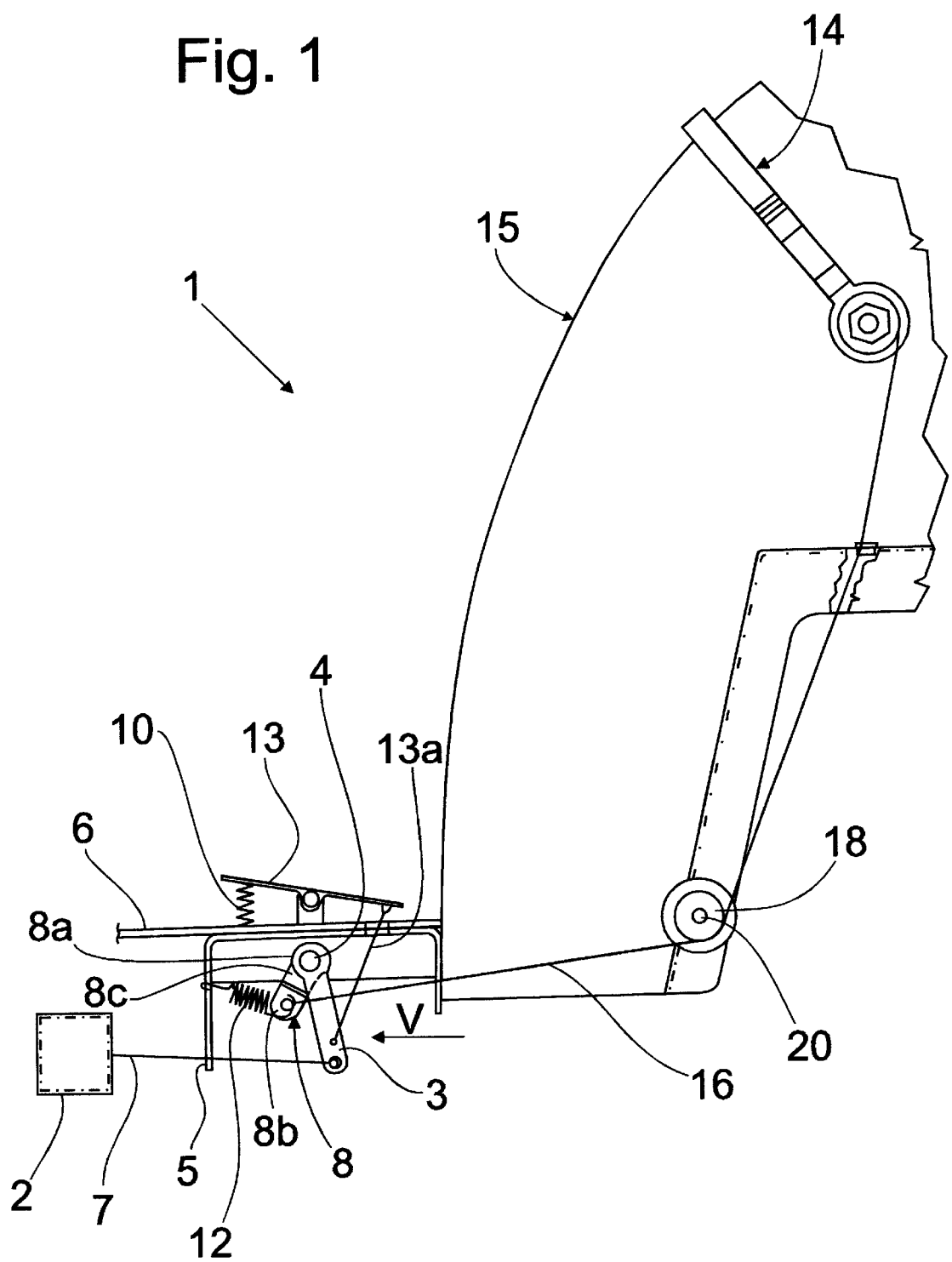
FIG. 1 is a side elevational view of the acceleration control mechanism incorporating the principles of the present invention.

Referring first to FIG. 1, a mechanism 1 incorporating the principles of the instant invention for controlling an acceleration system 2, which is well known in the art and shown only schematically, of an agricultural machine can best be seen. The agricultural machine is preferably a tractor of known configuration, which can vary significantly in size and physical configuration. The representative tractor is only partially shown in FIG. 1.

Figure 2:
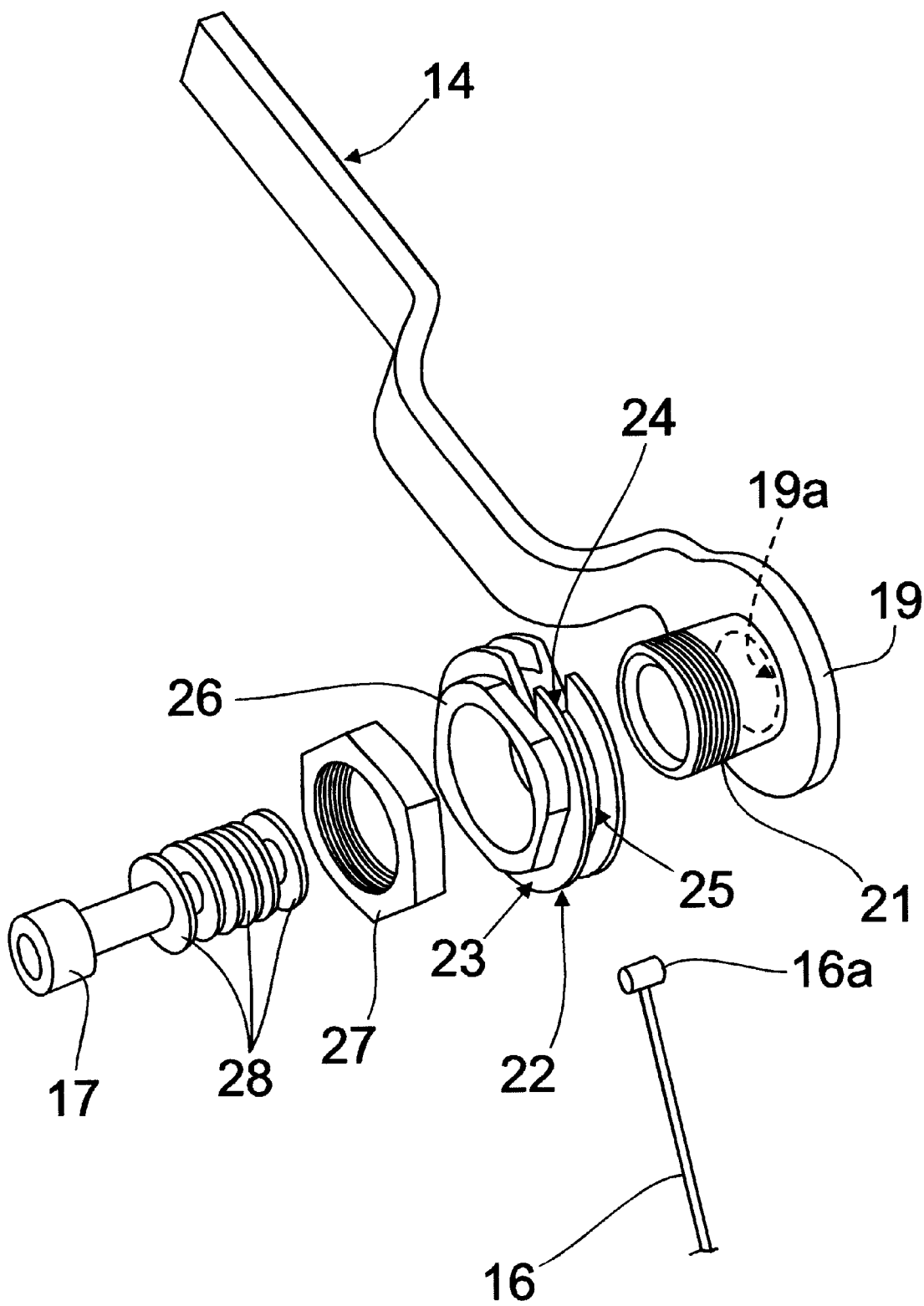
FIG. 2 is an exploded perspective view of a portion of the accelerator control mechanism shown in FIG. 1.

The accelerator control mechanism 1 includes a flat first lever 3 hinged at a first end to a pin 4 fitted integrally to a bracket 5 in turn fitted integrally to a platform 6 of the agricultural machine. A first tie 7 connects a second end of first lever 3 to acceleration system 2. A second lever 8 hinged at a first end to pin 4. A spring 12 is fitted between a second end of lever 8 and a bracket 5. A pedal 13, which when pressed downwardly rotates the lever 3 counterclockwise, as shown from the perspective of FIG. 1, in opposition to the force exerted by the spring 12 by virtue of the tie 13a. A third lever 14 is operatively mounted to a fender 15 of the tractor and is activated manually to control the known acceleration system 2. A second tie 16, which in opposition to the force exerted by the spring rotates the lever 8 counterclockwise, with respect to the perspective shown in FIG. 1, about the pin 4 in concert with the rotation of the lever 14 about a screw 17, as best seen in FIG. 2, securing the lever 14 to the fender 15. One end of tie 16 is fixed to the second end of the lever 8. A member 18 in the form of a pulley rotating about a screw 20 mounting the pulley to the fender 15 guides the tie 16.

Figure 3:
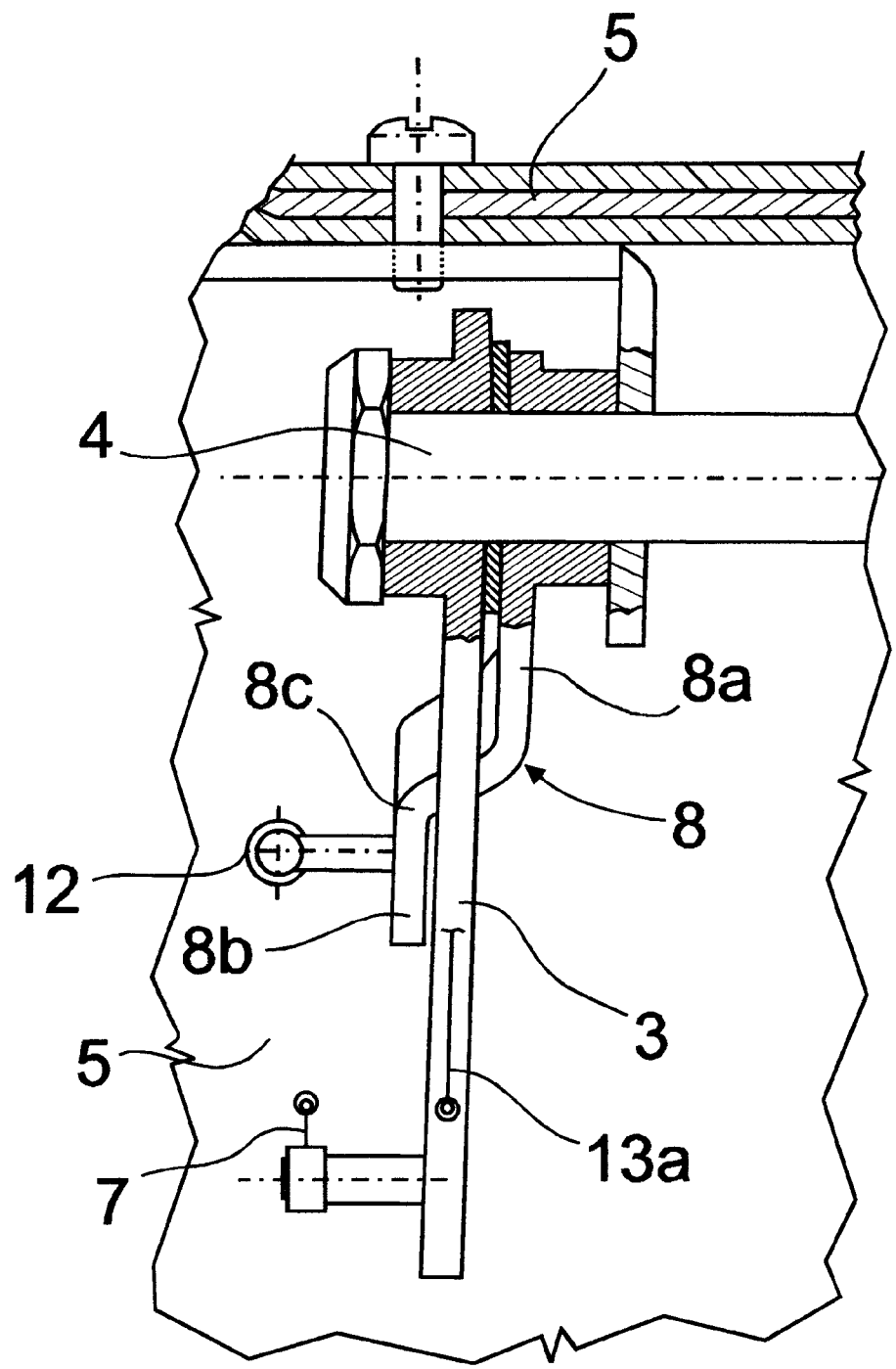
FIG. 3 is a side elevational view of a portion of the mechanism corresponding to the direction of arrow V in FIG. 1.

Referring now to FIGS. 1 and 3, it can be seen that the lever 8 includes a first portion 8a lying in a plane parallel to that of lever 3 and facing a first face of lever 3; a second portion 8b defined in a plane parallel to that of lever 3 and facing a second face of lever 3, opposite the first face; and a central portion 8c connecting portions 8a and 8b. The central portion, therefore, lies in a plane sloping with respect to the respective planes of the first and second portions 8a and 8b. In operation, the downward pressure on pedal 13 only rotates lever 3 counterclockwise, whereas the counterclockwise rotation of lever 14 rotates lever 8 counterclockwise, the central portion 8c also rotating the lever 3 to control the acceleration system 2.

With reference to FIG. 2, lever 14 has a substantially circular first end 19 having a through hole 19a coaxial with a hollow, externally threaded bushing 21 extending from one face of end 19. The mechanism 1 also includes a member 22 for adjusting the length of tie 16, and which, in the example embodiment shown, comprises a pulley 23 made of plastic material and having a seat 24 for housing an end pin 16a of tie 16. An annular groove 25 for housing portions of the tie 16 is operable to adjust the length of tie 16, or more specifically, the length of the portions of tie 16 connecting the pulley 23 to the second end of the lever 8.

Referring now to FIG. 2, the pulley 23 is fitted to the bushing 21, and has formed therein, on the opposite face to that facing lever 14, an annular element 26 having a square outer profile permitting, by means of a tool (not shown) engaged by element 26, adjustment of the angular position of pulley 23 about the axis of bushing 21. Accordingly, the adjustment of the length of the portion of tie 16 wound inside groove 25 is effected. Pulley 23 is locked to bushing 21, and hence to lever 14, by a nut 27, which is screwed onto the bushing 21 so that the pulley 23 is pressed against end 19 of lever 14 and thereby made angularly integral with lever 14. Screw 17, as stated, fastens lever 14 to fender 15, and is fitted with Belleville washers 28, which press against a seat (not shown) inside through hole 19a to provide an appropriate amount of friction between lever 14 and fender 15 when the lever 14 is rotated manually.

In actual use, after fitting the lever 3–8 assembly to bracket 5, and after fitting the guide member 18 and lever 14 to fender 15, a first end of tie 16 is fitted to the second end of lever 8, and the second end (pin 16a) of tie 16 is fitted to pulley 23 (seat 24) so that tie 16 cooperates with guide member 18. The pulley 23 is then fitted to bushing 21 and, using a tool, rotated about its own axis of rotation to wind part of tie 16 inside the groove 25 until the tie 16 is taut; and, keeping the pulley 23 in the same angular position. The pulley 23 and the lever 14 are made angularly integral by means of nut 27.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In an acceleration system for an agricultural machine, a first lever hinged at a first end to a fixed pin;
a first tie connecting a second end of said first lever to said acceleration system;
a second lever hinged at a first end to said fixed pin;
a pedal which, when pressed downwards by the user, rotates said first lever in a first direction, and thereby controls said acceleration system through said first tie;
a third lever fitted to a fixed structure of the agricultural machine, and which is activated manually to control said acceleration system by rotating the second lever in said direction;
a second tie connecting said third lever to said second lever;
said second lever rotating said first lever in said direction to also control said acceleration system by manually activating said third lever; and
a member cooperable with said second tie to adjust the length of said second tie.

2. The tractor of claim 1 wherein said member comprises a pulley having a seat housing an end pin of said second tie, and an annular groove to house portions of said second tie to adjust the length of said second tie connecting said pulley to said second lever.

3. The tractor of claim 2 wherein said third lever has a first end formed with a first face mounting a hollow, externally threaded bushing; said pulley being fitted to said bushing, and being made angularly integral with said third lever by a nut screwed to said bushing.

4. The tractor of claim 3 wherein said pulley further includes an annular element having an outer profile contoured to permit, in conjunction with a tool engaged with said element, adjustment of the angular position of said pulley about the axis of said bushing, and hence an adjustment of the length of the portion of said second tie wound inside said groove.

5. The tractor of claim 4 wherein said second lever includes a central portion ensuring that rotation of said second lever produces an equal corresponding rotation of said first lever.

6. The tractor of claim 5 wherein said fixed structure comprises a fender of said tractor, a screw pivotally fixing said third lever to said fender, said screw supporting a spring pressing said third lever against said fender to achieve a correct frictional relationship therebetween when said third lever is rotated manually.

7. The tractor of claim 6 wherein said pulley is made of plastic material.

8. An acceleration control mechanism for an agricultural machine comprising:
a first lever hinged at a first end to a fixed pin;
a first tie connecting a second end of said first lever to said acceleration system;
a second lever hinged at a first end to said fixed pin;
a pedal which when depressed rotates said first lever in a first direction controlling acceleration of said agricultural machine via said first tie;
a manually activated third lever mounted on a fixed structure of said agricultural machine, manual activation of said third lever effecting control of acceleration system by rotating the second lever in said first direction;
a second tie connecting said third lever to said second lever; said second lever being operable to rotate said first lever in a first direction to also control said acceleration system by manipulating said third lever; and
a member cooperable with said second tie to adjust the length of said second tie.

9. The acceleration control mechanism of claim 8 wherein said member comprises a pulley having a seat housing an end pin of said second tie, and an annular groove to house portions of said second tie to adjust the length of said second tie connecting said pulley to said second lever.

10. The acceleration control mechanism of claim 9 wherein said pulley further includes an annular element having an outer profile contoured to permit, in conjunction with a tool engaged with said element, adjustment of the angular position of said pulley about the axis of said bushing, and hence an adjustment of the length of the portion of said second tie wound inside said groove.

11. The acceleration control mechanism of claim 10 wherein said second lever includes a central portion ensuring that rotation of said second lever produces an equal corresponding rotation of said first lever.

12. The acceleration control mechanism of claim 11 wherein said fixed structure comprises a fender of said tractor, a screw pivotally fixing said third lever to said fender, said screw supporting a spring pressing said third lever against said fender to achieve a correct frictional relationship therebetween when said third lever is rotated manually.

13. The acceleration control mechanism of claim 12 wherein said third lever has a first end formed with a first face mounting a hollow, externally threaded bushing; said pulley being fitted to said bushing, and being made angularly integral with said third lever by a nut screwed to said bushing.

* * * * *